(12) United States Patent
Sanchez

(10) Patent No.: US 12,282,967 B2
(45) Date of Patent: Apr. 22, 2025

(54) SYSTEMS AND METHODS FOR GENERATING INSURANCE POLICIES WITH PREDESIGNATED POLICY LEVELS AND REIMBURSEMENT CONTROLS

(71) Applicant: QUANATA, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 14 days.

(21) Appl. No.: 18/177,034

(22) Filed: Mar. 1, 2023

(65) Prior Publication Data
US 2023/0206345 A1    Jun. 29, 2023

Related U.S. Application Data

(63) Continuation of application No. 16/793,653, filed on Feb. 18, 2020, now Pat. No. 11,620,715.

(51) Int. Cl.
| | |
|---|---|
| *G06Q 40/08* | (2012.01) |
| *G06F 3/0482* | (2013.01) |
| *G06F 16/28* | (2019.01) |
| *G06Q 10/087* | (2023.01) |
| *G06Q 10/10* | (2023.01) |
| *G06Q 20/10* | (2012.01) |

(Continued)

(52) U.S. Cl.
CPC ........... *G06Q 40/08* (2013.01); *G06F 3/0482* (2013.01); *G06F 16/285* (2019.01); *G06Q 10/087* (2013.01); *G06Q 10/10* (2013.01); *G06Q 20/108* (2013.01); *G06Q 20/342* (2013.01); *G06Q 30/0278* (2013.01)

(58) Field of Classification Search
CPC ....................................................... G06Q 40/08
USPC ............................................................ 705/4
See application file for complete search history.

(56) References Cited

U.S. PATENT DOCUMENTS

| | | |
|---|---|---|
| 7,107,239 B2 | 9/2006 | Graff |
| 7,941,330 B1 | 5/2011 | Buentello et al. |
| 8,041,636 B1 | 10/2011 | Hunter et al. |

(Continued)

*Primary Examiner* — William E Rankins
(74) *Attorney, Agent, or Firm* — BRYAN CAVE LEIGHTON PAISNER LLP

(57) ABSTRACT

A computer system for providing reimbursement controls to insurance policies is provided. The computer system may include a processor in communication with a memory device. The processor may be configured to: (i) generate a plurality of predesignated policy levels having a maximum reimbursement amount for a user based at least in part upon user data, (ii) prompt the user to select a predesignated policy level of the plurality of predesignated policy levels that includes an insurance policy covering one or more item categories up to the associated maximum reimbursement amount, (iii) store the selected predesignated policy level, (iv) receive a claim from the user, (v) determine, in response to the claim and based at least in part upon the selected predesignated policy level and the associated maximum reimbursement amount, an actual reimbursement amount for each insured item category of the one or more item categories, and (vi) provide a payment device to the user having reimbursement controls that provide the actual reimbursement amount by insured item category.

21 Claims, 6 Drawing Sheets

(51) Int. Cl.
 *G06Q 20/34* (2012.01)
 *G06Q 30/02* (2023.01)

(56) References Cited

U.S. PATENT DOCUMENTS

| | | | |
|---|---|---|---|
| 8,335,700 B2 | 12/2012 | Zizzamia et al. | |
| 8,543,430 B1 | 9/2013 | Fields et al. | |
| 9,361,599 B1* | 6/2016 | Biemer | G06Q 10/0635 |
| 9,836,792 B2 | 12/2017 | Dixon | |
| 9,836,793 B2 | 12/2017 | Busque et al. | |
| 10,102,588 B1* | 10/2018 | Gonsalves | G06Q 40/08 |
| 10,102,590 B1* | 10/2018 | Farnsworth | G06Q 40/08 |
| 10,176,532 B1 | 1/2019 | Hanson et al. | |
| 10,210,577 B1* | 2/2019 | Davis | G06Q 10/087 |
| 10,223,750 B1 | 3/2019 | Loo et al. | |
| 10,262,375 B1 | 4/2019 | Howard | |
| 10,300,373 B2 | 5/2019 | Hickman et al. | |
| 10,311,521 B1* | 6/2019 | Capone | G06Q 40/08 |
| 10,339,604 B1 | 7/2019 | Cook | |
| 10,593,109 B1 | 3/2020 | Floyd | |
| 10,977,734 B1 | 4/2021 | Kenney | |
| 2002/0062249 A1 | 5/2002 | Iannacci | |
| 2007/0118410 A1 | 5/2007 | Nadai | |
| 2010/0044430 A1 | 2/2010 | Song et al. | |
| 2011/0066454 A1 | 3/2011 | Rosauer et al. | |
| 2011/0161117 A1 | 6/2011 | Busque et al. | |
| 2011/0251917 A1 | 10/2011 | Etzioni et al. | |
| 2012/0239564 A1* | 9/2012 | Summerrow | G06Q 20/28 705/41 |
| 2012/0253852 A1 | 10/2012 | Pourfallah et al. | |
| 2012/0323609 A1 | 12/2012 | Fini | |
| 2013/0262156 A1 | 10/2013 | Ketzef | |
| 2014/0081675 A1 | 3/2014 | Ives et al. | |
| 2014/0122134 A1 | 5/2014 | Fini | |
| 2014/0180725 A1 | 6/2014 | Ton-That et al. | |
| 2014/0278573 A1 | 9/2014 | Cook | |
| 2014/0279474 A1 | 9/2014 | Evans et al. | |
| 2015/0006206 A1 | 1/2015 | Mdeway | |
| 2015/0127430 A1 | 5/2015 | Hammer, III | |
| 2015/0178851 A1 | 6/2015 | Dutt et al. | |
| 2015/0206249 A1 | 7/2015 | Fini | |
| 2016/0035038 A1 | 2/2016 | Perkins | |
| 2016/0180468 A1 | 6/2016 | Buss et al. | |
| 2016/0232615 A1 | 8/2016 | Le | |
| 2017/0323319 A1 | 11/2017 | Rattner et al. | |
| 2019/0005586 A1 | 1/2019 | Lei et al. | |
| 2019/0080325 A1 | 3/2019 | Pourfallah et al. | |
| 2020/0302322 A1 | 9/2020 | Tukiainen et al. | |
| 2021/0090177 A1 | 3/2021 | Sears | |

* cited by examiner

SYSTEMS AND METHODS FOR GENERATING INSURANCE POLICIES WITH PREDESIGNATED POLICY LEVELS AND REIMBURSEMENT CONTROLS

This application is a continuation of U.S. patent application Ser. No. 16/793,653, filed Feb. 18, 2020, the entire disclosure of which is incorporated by reference herein for all purposes.

FIELD OF THE DISCLOSURE

The present disclosure relates to applying reimbursement controls to insurance policies, and more particularly, to computer-based systems and methods allowing a user to select an insurance policy with corresponding reimbursement controls from a plurality of predesignated policy levels and in response to a claim event, providing restricted access to reimbursement funds according to the selected insurance policy of the user.

BACKGROUND

At least some known insurance policies (e.g., renter's insurance, rental insurance, homeowner's insurance, and/or property insurance) provide coverage for the loss of and/or damage to personal possessions of a user after a loss event. Loss events may include, for example, residential fires, theft, vandalism and/or other events that cause partial or complete loss of the personal possessions of the user. After a loss event, a user may submit a policy claim to an insurance provider through a formal request by the user to the insurance provider for compensation to replace the personal possessions covered under the insurance policy of the user. Insurance providers set policy premiums based at least in part upon a number of factors including the amount of coverage that the policy provides (e.g., based at least in part upon the number and value of personal possessions covered by the policy).

Policy coverage is associated with the amount of risk or liability that is covered by the insurance provider for the user's personal possessions. In other words, the policy coverage is related to the amount of funds an insurance provider will pay a user for damaged or lost possessions. As such, a user may select a policy that covers a desired amount of the user's personal possessions.

In some cases, it may be not needed to provide coverage for every personal possession owned by users. In fact, users may prefer to not have every personal item covered by insurance because preparing claims that cover all items may be tedious and time consuming for the users. Further, processing these claims by the insurance providers may take a lot of time and resources. Users may also experience delays in receiving compensation for their lost and/or damaged personal possessions from the loss event when so many possessions are covered and are damaged. Accordingly, there is a need for insurance providers to allow users to pick which insurance policy the users prefer from predesignated policy levels with associated reimbursement controls (e.g., reimbursement amounts based at least in part upon a percentage of lost/damaged personal possessions) for the personal possessions of the users.

BRIEF SUMMARY

The present embodiments may relate to systems and methods for implementing insurance policies with reimbursement controls. The system may include a reimbursement control computing device, one or more user devices, one or more insurance provider devices, and/or one or more databases.

In one aspect, a computer system for providing reimbursement controls to insurance policies may be provided. The computer system may include one processor in communication with at least one memory device, and the at least one processor may be configured to: (i) generate a plurality of predesignated policy levels for a user based at least in part upon user data, wherein each predesignated policy level of the plurality of predesignated policy levels is associated with a maximum reimbursement amount, (ii) prompt the user to select a predesignated policy level of the plurality of predesignated policy levels, the predesignated policy level including an insurance policy covering one or more item categories up to the associated maximum reimbursement amount, (iii) store, in the at least one memory device, the selected predesignated policy level selected by the user, (iv) receive a claim from the user, (v) determine, in response to the claim and based at least in part upon the selected predesignated policy level and the associated maximum reimbursement amount, an actual reimbursement amount for each insured item category of the one or more item categories, and/or (vi) provide a payment device to the user, the payment device having one or more reimbursement controls for providing the actual reimbursement amount. The computer system may include additional, less, or alternate functionality, including that discussed elsewhere herein.

In another aspect, a computer-implemented method for providing reimbursement controls to insurance policies is provided. The method may be implemented using a computer system including at least one processor in communication with at least one memory device, and the method may include: (i) generating a plurality of predesignated policy levels for a user based at least in part upon user data, wherein each predesignated policy level of the plurality of predesignated policy levels is associated with a maximum reimbursement amount, (ii) prompting the user to select a predesignated policy level of the plurality of predesignated policy levels, the predesignated policy level including an insurance policy covering one or more item categories up to the associated maximum reimbursement amount, (iii) storing, in the at least one memory device, the selected predesignated policy level selected by the user, (iv) receiving a claim from the user, (v) determining, in response to the claim and based at least in part upon the selected predesignated policy level and the associated maximum reimbursement amount, an actual reimbursement amount for each insured item category of the one or more item categories, and/or (vi) providing a payment device to the user having reimbursement controls, wherein the reimbursement controls provide the actual reimbursement amount to the user by insured item category. The method may include additional, less, or alternate actions, including those discussed elsewhere herein.

In a further aspect, at least one non-transitory computer-readable media having computer-executable instructions thereon may be provided. When executed by at least one processor of a computer system in communication with at least one memory device, the instructions may cause the at least one processor to: (i) generate a plurality of predesignated policy levels for a user based at least in part upon user data, wherein each predesignated policy level of the plurality of predesignated policy levels is associated with a maximum reimbursement amount, (ii) prompt the user to select a predesignated policy level of the plurality of predesignated policy levels, the predesignated policy level including an insurance policy covering one or more item categories up to the associated maximum reimbursement amount, (iii) store, in the at least one memory device, the selected predesignated policy level selected by the user, (iv) receive a claim from the user, (v) determine, in response to the claim and based at least in part upon the selected predesignated policy level and the associated maximum reimbursement amount, an actual reimbursement amount for each insured item category of the one or more item categories, and/or (vi) provide a payment device to the user, the payment device having one or more reimbursement controls for providing the actual reimbursement amount. The instructions may direct additional, less, or alternate functionality, including that discussed elsewhere herein.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DRAWINGS

Figure 1:
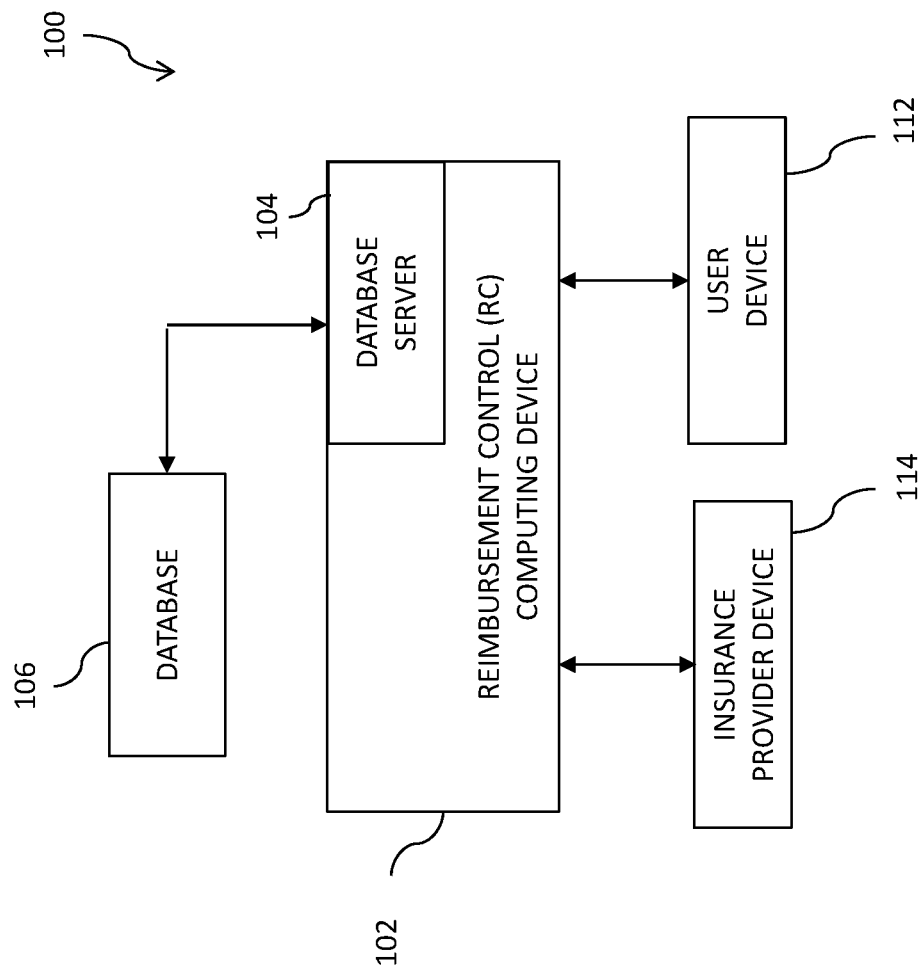
FIG. 1 depicts an exemplary computer system in accordance with an exemplary embodiment of the present disclosure.

The present embodiments may relate to, inter alia, systems and methods for providing reimbursement controls to insurance policies of users (e.g., policyholders or insureds). In one exemplary embodiment, the process may be performed by a reimbursement control ("RC") computing device (also referred to herein as an RC server or an RC system). In some embodiments, the RC computing device may be associated with an insurance provider.

The systems and methods described herein may generate predesignated policy levels and maximum reimbursement amounts associated with each predesignated policy level for a user. The RC computing device may receive user data from the user (e.g., demographic, location, and/or personal property data) and may predict items (e.g., personal possessions and property) associated with and/or owned by the user using machine learning or artificial intelligence techniques. Based at least in part upon the predicted items, the RC computing device may generate predesignated policy levels and associated maximum reimbursement amounts that offer different levels of insurance coverage (e.g., basic, intermediate, and premium) for the items.

The predesignated policy levels may include maximum reimbursement amounts for each of a plurality of insured item categories (e.g., electronics, clothing, personal items, furniture, housewares, specialty items, etc.), and the user may select a desired predesignated policy level based at least in part upon the maximum reimbursement amounts. In some embodiments, the user may select the desired predesignated policy level through an application associated with the RC computing device with a single input (e.g., with one click). In response to a claim event (e.g., natural disaster, flooding, fire, theft, burglary, etc.), the RC computing device may receive a claim from the user for one or more insured items. The RC computing device may determine an actual reimbursement amount for the user based at least in part upon the selected policy level and associated maximum reimbursement amount of the user along with a percentage of damage to the insured items of the user. For example, for each insured item category, the user may receive the same percentage of the maximum reimbursement amount as the percentage of damage to the items. Accordingly, the RC computing device may determine and provide an actual reimbursement amount for each insured item category associated with the user. The RC computing device may provide the actual reimbursement in the form of a prepaid card such the prepaid card may include instructions and/or rules that restricts the user to only purchase items (e.g., using the actual reimbursement amounts) associated with each insured item category. Further details are provided below.

Examples of Predicting Insured Items

In one exemplary embodiment, the RC computing device may be commutatively linked to one or more databases (e.g., a historical policyholder database). The historical policyholder database may include a plurality of historical policyholder records associated with a plurality of policyholders. Each of the plurality of historical policyholder records may include a set of personal data associated with the policyholders and a list of actual items (e.g., electronics, clothing, personal items, furniture, housewares, specialty items, etc.) owned by each policyholder.

The policyholder records may be created from historical registration data of policyholders, or from historical claims data submitted by policyholders for reimbursement. The set of personal data may include demographic and location data (e.g., age, sex, occupation, education level, marital status, family size, household address, residence city/state, total floor plan area, number of bed rooms, etc.) associated with the policyholders. The list, for example, may be lists of items supplied by the policyholders when the policyholders first obtained insurance coverage for the items, and the RC computing device may categorize the items of the lists. The lists may further include an assigned value (e.g., associated with the cost to repair or replace the items) associated with each item included in the list. The assigned value, for example, may be included in the list supplied by the policyholders (e.g., the policyholders may include an estimated value for each item included in the list) and/or the assigned value may be assigned to each item by the RC computing device (e.g., the RC computing device may perform a search, like an internet search, for the value associated with each item of the list). Further, the RC computing device may assign a value to each category of the items based at least in part upon the assigned values of the items in each category.

In the exemplary embodiment, the RC computing device may retrieve, from the historical policyholder database, at least a subset of the historical policyholder records that include personal data and a list the items of the policyholders associated with the historical policyholder records. This subset of historical policyholder records may be used to generate a model that relates the personal data to the list for the policyholders. The model may further predict an average value associated with each category of items. The average values associated with each category of items may be the average cost to replace/repair each item included in each category. For example, an electronics category may include a laptop, a TV, and a desktop computer, and the value associated with the electronics category may be the price to replace/repair the laptop, the TV, and the desktop computer. For example, the RC computing device may find that a majority of middle-class 35-year-old female policyholders own electronics with an average value of $2,500, clothing with an average value of $4,500, furniture with an average value of $5,000, housewares with an average value of $1,500, and specialty items (e.g., jewelry, artwork, and collectors' items) with an average value of $12,000.

The model may be generated using any suitable technique (e.g., machine learning, artificial intelligence, neural networks, etc.), as further described herein.

Users may wish to register and/or enroll in a RC service associated with the RC computing device when the users want to enroll in an insurance policy (e.g., rental insurance, homeowner's insurance, etc.). For example, a user may want to obtain general coverage for items associated with the user without having to list each item and/or without having the insurance policy covering specific items. The RC computing device may prompt the users to enter personal data (e.g., age, sex, income level, employment status, marital status, etc.) associated with the users when the users enroll and/or register with the RC service.

The RC computing device may utilize the model to generate categories of items (also referred to herein as insured item categories) associated with the user and average values associated with the categories. In other words, the RC computing device may utilize the set of personal data as an input to the model to generate categories of items and the associated values of those items for the user. These categories of items and associated values would be what the model predicts as being owned by the user who inputted the personal data.

For example, a user may provide the RC computing device with personal data indicating that the user is a 35-year-old female with an average income of $105,000. The RC computing device may receive the personal data of the user, input the received personal data into the model of the RC computing device, and the RC computing device may predict that the user owns electronics with an average value of $2,500, clothing with an average value of $4,500, furniture with an average value of $5,000, housewares with an average value of $1,500, and specialty items (e.g., jewelry, artwork, and collectors' items) with an average value of $12,000. Further, the RC computing device may allow the user to edit the predicted categories of items and associated values.

In other embodiments, when the user registers for the RC service associated with the RC computing device, the user may provide the RC computing device (e.g., via a user interface) with a list of categories of items associated with and/or owned by the user. The user may further provide the RC computing device with an estimated value associated with each category. The RC computing device may store (e.g., in a database) the predicted categories and associated values and/or the provided categories and associated values for each user registered for the RC service.

Examples of Generating Predesignated Policy Levels and Maximum Reimbursement Amounts The RC computing device may generate predesignated policy levels (e.g., different levels of insurance coverage) for the user to select from based at least in part upon the predicted and/or provided categories of items and associated values. Each of the generated predesignated policy levels may be associated with different maximum reimbursement amounts for each category of items associated with the user.

In the exemplary embodiment, the predesignated policy levels may include a basic level, an intermediate level, and a premium level. In other embodiments, the predesignated policy levels may include fewer or more predesignated policy levels for the user to choose from. The basic level may include basic coverage and basic maximum reimbursement amounts for the items of the user, the intermediate level may include intermediate coverage and intermediate maximum reimbursement amounts for the items of the user, and the premium level may include premium coverage and premium maximum reimbursement amounts for the items of the user. For example, the basic level may offer a maximum reimbursement amount of 50% of the value associated with each category of items associated with the user, the intermediate level may offer a maximum reimbursement amount of 75% of the value associated with each category of items associated with the user, and the premium level may offer a maximum reimbursement amount of 90% of the value associated with each category of items associated with the user. Each level would also include a premium paid by the user (e.g., a monthly, bi-monthly, or yearly amount to retain the insurance policy) that reflects the different levels of coverage.

For example, if the RC computing device predicts that the user is associated with electronics with an average value of $2,500, clothing with an average value of $4,500, furniture with an average value of $5,000, housewares with an average value of $1,500, and specialty items with an average value of $12,000, the RC computing device may generate predesignated policy levels based at least in part upon these categories and associated values. The RC computing device may generate a basic level of coverage that offers a maximum reimbursement amount of 50% of the associated values for each category (e.g., $1,250 for electronics, $2,250 for clothing, $2,500 for furniture, $750 for housewares, and $6,000 for specialty items), an intermediate level of coverage that offers a maximum reimbursement amount of 75% of the associated values for each category (e.g., $1,875 for electronics, $3,375 for clothing, $3,750 for furniture, $1,125 for housewares, and $9,000 for specialty items), and a premium level of coverage that offers a maximum reimbursement amount of 90% of the associated values for each category (e.g., $2,250 for electronics, $4,050 for clothing, $4,500 for furniture, $1,350 for housewares, and $10,800 for specialty items).

Examples of User Selection of Predesignated Policy

The RC computing device may display the generated predesignated policy levels to the user (e.g., through a user interface) and prompt the user to select a predesignated policy level of the plurality of predesignated policy levels. In some embodiments, the user may be able to select the predesignated policy level with minimal input (e.g., using one-click). In other embodiments, RC computing device may allow the user to provide additional input. For example, the user may edit the predicted categories of items and the associated values, add categories and associated values not included in the predicted categories, request different policies to better meet the needs of the user, etc.

The user may choose the predesignated policy based at least in part upon the needs of the user. For example, if the user wants to pay the least amount possible for an insurance premium while still covering at least some of the items associated with the user, the user may select the basic level of coverage. If the user prefers to cover the maximum amount possible of the items associated with the user and is willing to pay a higher insurance premium, the user may select the premium level of coverage.

When the user has selected the predesignated policy level, the RC computing device may store the predesignated policy level and the associated user or user identifier in a database associated with the RC computing device. In the exemplary embodiment, the RC computing device may be in communication with and/or part of an insurance provider device (e.g., associated with an insurance provider of the user) such that the RC computing device may finalize the insurance policy of the user after the user accepts the terms and conditions of the insurance policy (e.g., such that the selected insurance policy of the user is immediately effective). In other embodiments, the RC computing device may transmit the selected predesignated policy level to the insurance provider device such that the insurance provider may finalize the insurance policy of the user and receive any additional information from the user (e.g., payment information).

Examples of Determining Reimbursement After Claim Event

In response to a claim event (e.g., a natural disaster, fire, burglary, theft, etc.), the user may submit a claim to the insurance provider associated with the selected policy level (e.g., through the RC computing device) to request reimbursement for items associated with the user that are covered by the selected policy level. The claim may include a description of the items that were lost, destroyed, or damaged and/or a list of items that were spared or unharmed in the claim event. In some embodiments, the claim may include images and/or video such that RC computing device may determine the items that are destroyed or damaged and/or the list of items that are spared or unharmed. Further, the claim may include a police report or other evidence that the claim event took place. In some embodiments, the user may only give a percentage of items lost in each category. For example, if 40% of the user's electronics were stolen (and no other items/item categories were affected), the user may simply input into the RC computing device that 40% of electronics were stolen.

Based at least in part upon the claim, the RC computing device may determine a percentage of each category of items that needs to be replaced or repaired. In other words, the RC computing device may determine which percentage of each category of items was affected by the claim event. For example, if the claim event is a hurricane that destroys a home of the user, the RC computing device may determine that 100% of each category of items needs to be replaced. If the claim event is a burglary where the burglar took a television, a laptop, and some jewelry of the user, the RC computing device may determine that 100% of the electronics of the user and 40% of the jewelry of the user needs to be replaced.

The RC computing device may compare the determined percentage of each category of items that need to be replaced or repaired with the selected policy of the user to determine an actual reimbursement amount associated with each category of items for the user. The RC computing device may use the determined percentage of each category as the percentage of the maximum reimbursement amount of each category that the user may receive as the actual reimbursement. For example, in the case of the hurricane that destroys the home of the user, the RC computing device may determine that the actual reimbursement amount for the user is 100% of the maximum reimbursement amount for each category (e.g., the actual reimbursement amount is the maximum reimbursement amount for each category). In the case of the burglary where 100% of the electronics of the user and 40% of the jewelry of the user was lost and/or damaged, the RC computing device may determine that the actual reimbursement amount for the user is 100% of the electronics maximum reimbursement amount and 40% of the jewelry maximum reimbursement amount. That is, if the maximum reimbursement amounts of the policy of the user are $1,500 for electronics and $2,000 for jewelry, the RC computing device may reimburse the user $1,500 for electronics and $800 for jewelry, and the user may receive no other reimbursements for items in other categories since the items of the other categories were not lost and/or damaged. Using the maximum reimbursement amounts and percentages from the claim, the RC computing device may quickly and efficiently process claims for the user in response to the claim event.

Examples of Providing Reimbursement After Claim Event

After the RC computing device determines the actual reimbursement amount for the user, the RC computing device may provide the actual reimbursement amount to the user. In the exemplary embodiment, the RC computing device may provide a payment device to the user, and the payment device may have reimbursement controls thereon. The reimbursement controls may provide the actual reimbursement amount to the user by the insured item category, and the reimbursement controls may ensure (e.g., through rules and/or instructions) that the user only spends the reimbursement amount on items (e.g., replacement items) of the insured item category associated with the actual reimbursement amount.

In the exemplary embodiment, the RC computing device may issue one or more pre-paid cards as the payment device. The pre-paid cards may allow the RC computing device to enforce the reimbursement controls for the actual reimbursements, and the pre-paid cards may have rules thereon that restricts the user to only purchase one or more replacement items associated with the insured item category (or categories) of the actual reimbursement amount. The pre-paid card may decline a purchase transaction if the one or more replacement items are not in the insured item category associated with the actual reimbursement (e.g., when the rules are not met), and the pre-paid card may allow the purchase transaction to proceed if the one or more replacement items are in the insured item category associated with the actual reimbursement (e.g., when the rules are met). For example, the pre-paid card may determine the category of the one or more replacement items based at least in part upon a merchant category of a merchant where the one or more replacement items are being purchased and/or a stock keeping unit (SKU) of the one or more replacement items. For example, if the RC computing device determines that the provided payment device should include an actual reimbursement amount, based at least in part upon the policy and maximum reimbursement amount of the user, of $1,500 for electronics and $800 for jewelry, the payment device may only allow the user to spend the $1,500 reimbursement amount at merchants that sell electronics and the $800 reimbursement amount only at merchants that sell jewelry. Further, the payment device may only allow the user to spend the $1,500 reimbursement amount on replacement items that have SKUs that relate to electronics and the $800 reimbursement amount on replacement items that have SKUs that relate to jewelry.

In other embodiments, the RC computing device may provide the actual reimbursement amount to the user through any suitable payment device such that the payment device may have reimbursement controls. For example, the payment device may be a credit card, a debit card, a prepaid card, a charge card, a membership card, a promotional card, a prepaid card, a gift card, a card that is part of a digital wallet, and/or any other device that may hold payment account information, such as mobile phones, smartphones, personal digital assistants (PDAs), key fobs, and/or computers. Through providing the reimbursement to the user in a format that is easy for the user to redeem, the RC computing device ensures that the user only spends the actual reimbursement amount on the categories of items that the actual reimbursement amount corresponds to while ensuring that the user can replace/repair the lost/damaged items quickly after a claim event.

At least one technical problem addressed by this system may include: (i) complicated and technical insurance policies that are hard for users to understand, (ii) inability of users to insure categories of items instead of individual items, (iii) long claim processing timelines that make it difficult for users to receive reimbursement and/or replace items after claim events, and (iv) inability to provide controlled access to reimbursement funds to users.

The methods and systems described herein may be implemented using computer programming or engineering techniques including computer software, firmware, hardware, or any combination thereof, where the technical effect may be achieved by performing at least one of the following steps: (a) generating a plurality of predesignated policy levels for a user based at least in part upon user data, wherein each predesignated policy level of the plurality of predesignated policy levels is associated with a maximum reimbursement amount, (b) prompting the user to select a predesignated policy level of the plurality of predesignated policy levels, the predesignated policy level including an insurance policy covering one or more item categories up to the associated maximum reimbursement amount, (c) storing, in the at least one memory device, the selected predesignated policy level selected by the user, (d) receiving a claim from the user, (e) receiving a claim from the user, and/or (f) providing a payment device to the user having reimbursement controls, wherein the reimbursement controls provide the actual reimbursement amount to the user by insured item category.

At least one technical solution addressed by this system may include: (i) generating and providing a plurality of predesignated policy levels and associated reimbursement controls for a user based at least in part upon categories of items associated with the user instead of individual items associated with the user, (ii) allowing the user to select a predesignated policy level of the plurality of predesignated policy levels, (iii) in a claim event, facilitating quick and easy claim preparation for the user and reimbursement determination by only needing the user to claim a percentage of items damaged in the claim event, not a status of each item associated with the user, (iv) providing the user with a fixed reimbursement amount, and (v) ensuring that the user only replaces the items which the user had covered by the selected predesignated policy level.

Exemplary Computer Networks

FIG. 1 depicts a simplified block diagram of an exemplary system 100. In the exemplary embodiment, system 100 may be used for providing reimbursement controls to insurance policies for a user (e.g., associated with user device 112). In the exemplary embodiment, system 100 may include a reimbursement control (RC) computing device 102 and a database server 104. RC computing device 102 may be in communication with one or more databases 106, user devices 112, and/or insurance provider devices 114.

In the exemplary embodiment, user device 112 may be computers that include a web browser or a software application, which enables user device 112 to access remote computer devices, such as RC computing device 102, using the Internet or other network. More specifically, user device 112 may be communicatively coupled to RC computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User device 112 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

An insurance provider device 114 may be communicatively coupled with RC computing device 102. In some embodiments, insurance provider device 114 may be associated with, or is part of a computer network associated with an insurance provider, or in communication with the insurance provider's computer network (not shown). In other embodiments, insurance provider device 114 may be associated with a third party and is merely in communication with the insurance provider's computer network. That is, insurance provider device 114 may be associated with the insurance provider of the user. More specifically, insurance provider device 114 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurance provider device 114 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Database server 104 may be communicatively coupled to database 106 that stores data. In one embodiment, database 106 may include user data associated with users, generated predesignated policy levels and associated maximum reimbursement amounts, historical policyholder data, selected policies for the users, property data associated with the users, etc. In the exemplary embodiment, database 106 may be stored remotely from RC computing device 102. In some embodiments, database 106 may be decentralized. In the exemplary embodiment, a user may access database 106 and/or RC computing device via user device 112.

RC computing device 102 may be in communication with a plurality of user devices 112 and insurance provider device 114 to generate predesignated policy levels and maximum reimbursement amounts associated with each predesignated policy level for the user. In some embodiments, RC computing device 102 may be associated with an insurance provider or in communication with the insurance provider's computer network (not shown). In other embodiments, RC computing device 102 may be associated with a third party and is merely in communication with the insurance provider device 114.

Exemplary Processes for Providing Reimbursement Controls

Figure 2:
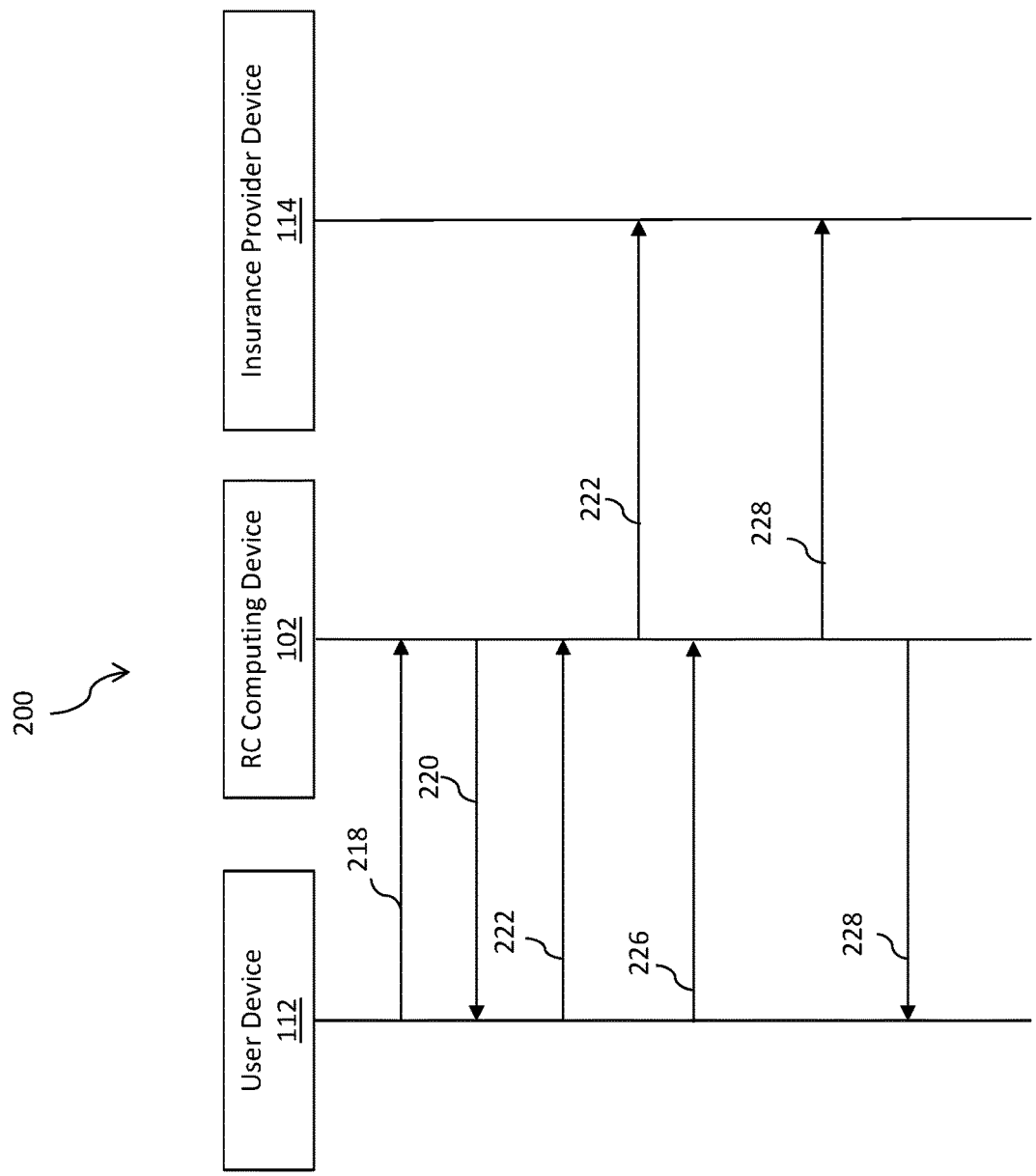
FIG. 2 depicts a flow chart of a process that may be carried out by the computer system illustrated in FIG. 1.

FIG. 2 illustrates a flow chart of an exemplary process 200 for providing reimbursement controls to insurance policies for a user (e.g., associated with user device 112). Process 200 may be carried out by system 100 (shown in FIG. 1).

In the exemplary embodiment, RC computing device 102 may receive user data 218 from user device 112. Using the received user data 218, RC computing device 102 may predict items and categories associated with the items of the user and generate a plurality of predesignated policy levels 220. Each of the generated predesignated policy levels 220 may be associated with different maximum reimbursement amounts for each category of items (e.g., insured item categories) associated with the user. Predesignated policy levels 220 may each provide a different amount of coverage to the categories of items of the user, and predesignated policy levels 220 may include basic, intermediate, and premium coverage. RC computing device 102 may transmit predesignated policy levels 220 to user device 112 and prompt the user to select a predesignated policy level of the plurality of predesignated policy levels 220. Predesignated policy levels 220 may be displayed to the user on user device 112 (e.g., through an application associated with RC computing device 102) such that the user associated with user device 112 may easily select (e.g., with "one-click" or other minimal input) a predesignated policy level 220 that best meets the needs of the user. After the user selects predesignated policy level 220 that the user would like to enroll in, a selected policy level 222 may be sent to RC computing device 102 from user device 112, and RC computing device 102 may store selected policy level 222. In the exemplary embodiment, RC computing device 102 may send selected policy level 222 to insurance provider device 114. In other embodiments, user device 112 may send selected policy level 222 directly to RC computing device 102 and insurance provider device 114. In some embodiments, RC computing device 102 may finalize enrolling the user in selected policy level 222 such that the items associated with the user are covered under selected policy level 222. In other embodiments, insurance provider device 114 may finalize the enrollment of the user in selected policy level 222.

After a claim event occurs (e.g., a natural disaster, fire, flood, burglary, theft, etc.) that affects the items associated with the user, the user may submit a claim 226 to RC computing device 102. Claim 226 may include a percentage of categories of items associated with the user that were lost/damaged from the claim event, and/or claim 226 may include a percentage of categories of items associated with the user that were spared (e.g., not lost or damaged) from the claim event. Additionally or alternatively, claim 226 may include a list of items associated with the user that are damaged/spared and/or images or video showing the items associated with the user that are damaged/spared such that RC computing device 102 may determine the percentage of categories of items that are damaged and/or spared. In response to receiving claim 226, RC computing device 102 may retrieve selected policy level 222 associated with the user and compare selected policy level 222 and the maximum reimbursement amount associated with selected policy level 222 to determine an actual reimbursement amount 228 for the user. Actual reimbursement amount 228 may include multiple reimbursement amounts that relate to each category of items of the user. RC computing device 102 may transmit actual reimbursement amount 228 to insurance provider device 114 such that insurance provider device 114 may process actual reimbursement amount 228.

In the exemplary embodiment, RC computing device 102 may provide actual reimbursement amount 228 to user computing device 112 and/or directly to the user. Actual reimbursement amount 228 may include reimbursement controls such that the user may only purchase items associated with the category of items that each actual reimbursement amount 228 relates to. For example, if the claim event is a burglary where 100% of the electronics of the user and 40% of the jewelry of the user was lost and/or damaged, RC computing device 102 may determine that actual reimbursement amount 228 for the user is 100% of the electronics maximum reimbursement amount and 40% of the jewelry maximum reimbursement amount. That is, if the maximum reimbursement amounts of the policy of the user are $1,500 for electronics and $2,000 for jewelry, RC computing device 102 may provide actual reimbursement amount 228 of $1,500 for electronics and $800 for jewelry to the user. RC computing device 102 may provide actual reimbursement amount 228 to the user in the form of a payment device having reimbursement controls thereon. Reimbursement controls of the payment device may provide actual reimbursement amount 228 to the user by insured item category. Further, the payment device may include rules thereon that restricts the user such that actual reimbursement amount 228 may only be spent purchasing replacement items that relate to insured item categories of actual reimbursement amount 228. In some embodiments, the payment device may be in the form of a pre-paid card. In other embodiments, the payment device may be in the form of digital wallet credit or any other form such that actual reimbursement amount 228 may be restricted by RC computing device 102.

Exemplary User Devices

Figure 3:
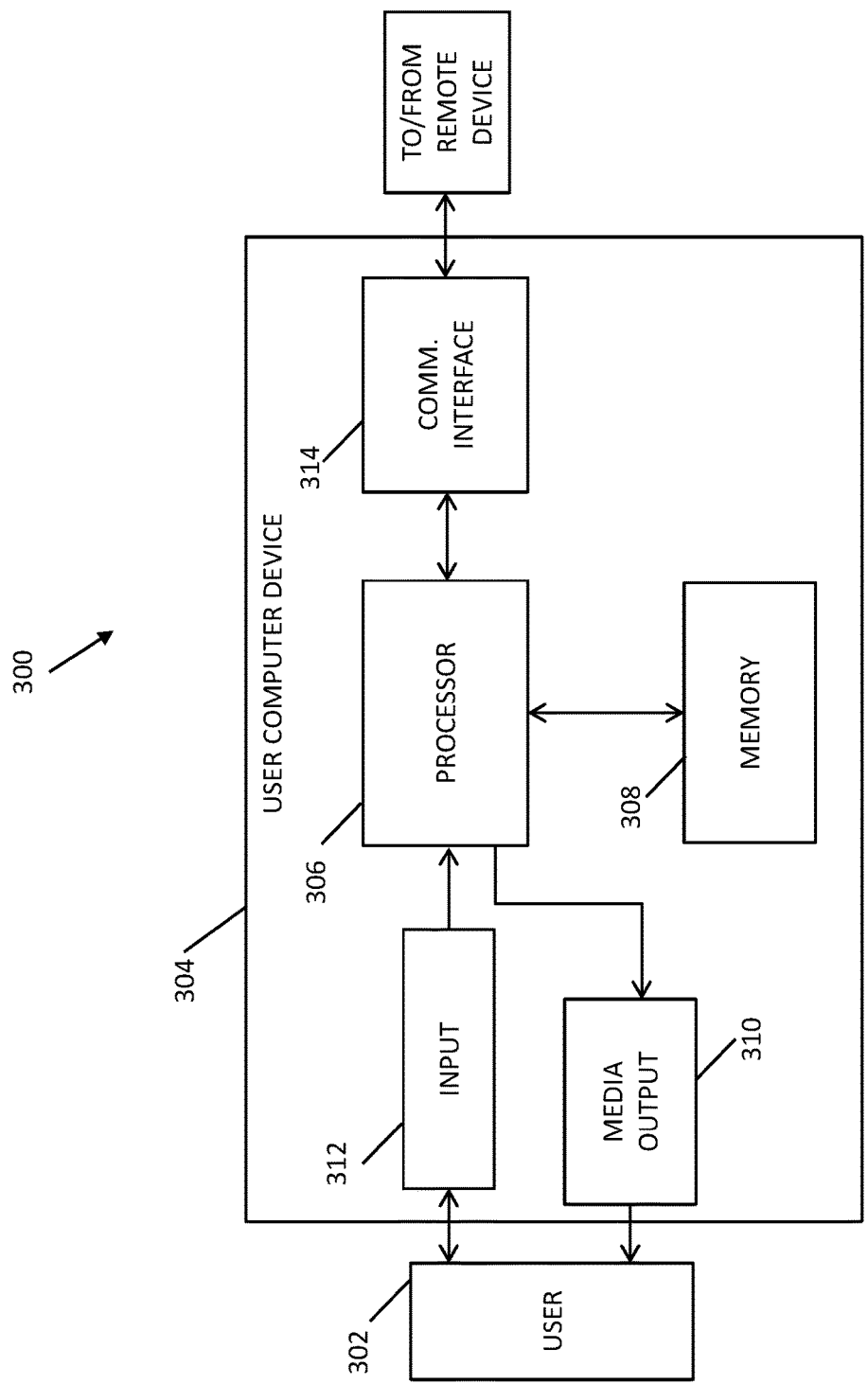
FIG. 3 depicts an exemplary client computing device that may be used with the exemplary computer system illustrated in FIG. 1.

FIG. 3 depicts an exemplary configuration 300 of a user computer device 304 (e.g., user device 112, shown in FIG. 1), in accordance with one embodiment of the present disclosure. User computer device 304 may be operated by a user 302. User computer device 304 may include, but is not limited to, user device 112 and insurance provider device 114 (shown in FIG. 1). User computer device 304 may include a processor 306 for executing instructions. In some embodiments, executable instructions may be stored in a memory 308. Processor 306 may include one or more processing units (e.g., in a multi-core configuration). Memory 308 may be any device allowing information such as executable instructions and/or transaction data to be stored and retrieved. Memory 308 may include one or more computer readable media.

User computer device 304 may also include one media output component 310 for presenting information to user 302. Media output component 310 may be any component capable of conveying information to user 302. In some embodiments, media output component 310 may include an output adapter (not shown) such as a video adapter and/or an audio adapter. An output adapter may be operatively coupled to processor 306 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 310 may be configured to present a graphical user interface (e.g., a web browser and/or a client application) to user 302. In some embodiments, user computer device 304 may include an input device 312 for receiving input from user 302. User 302 may use input device 312 to, without limitation, select a predesignated policy level of the plurality of predesignated policy levels and/or submit a claim in response to a claim event.

Input device 312 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 310 and input device 312.

User computer device 304 may also include a communication interface 314, communicatively coupled to a remote device such as RC computing device 102 (shown in FIG. 1). Communication interface 314 may include, for example, a wired or wireless network adapter and/or a wireless data transceiver for use with a mobile telecommunications network.

Stored in memory 308 are, for example, computer readable instructions for providing a user interface to user 302 via media output component 310 and, optionally, receiving and processing input from input device 312. A user interface 302 may include, among other possibilities, a web browser and/or a client application. Web browsers enable users, such as user 302, to display and interact with media and other information typically embedded on a web page or a website from RC computing device 102 (shown in FIG. 1). A client application may allow user 302 to interact with, for example, RC computing device 102. For example, instructions may be stored by a cloud service, and the output of the execution of the instructions sent to the media output component 310.

Exemplary Server Devices

Figure 4:
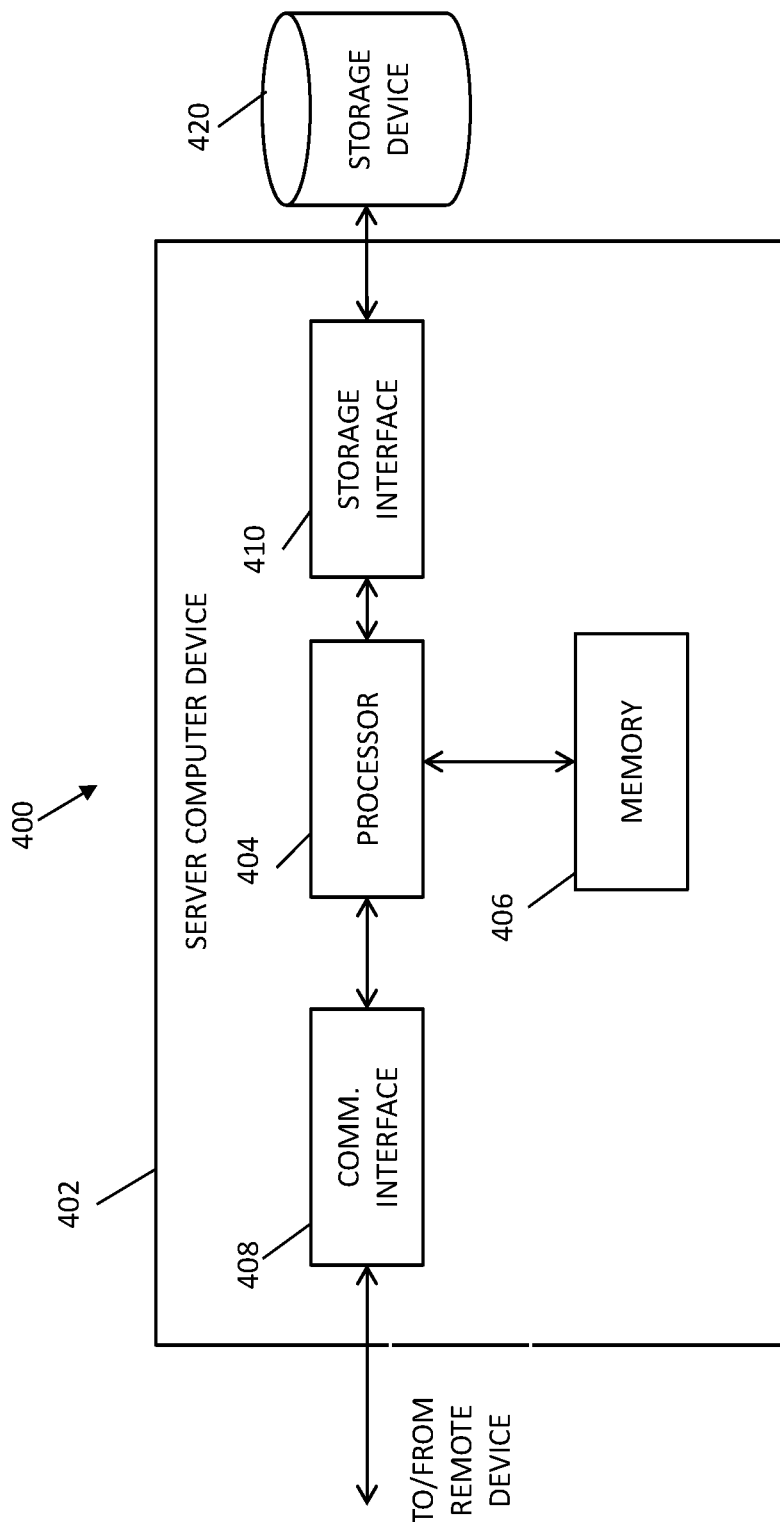
FIG. 4 depicts an exemplary server system that may be used with the exemplary computer system illustrated in FIG. 1.

FIG. 4 depicts an exemplary configuration of a server system 400, in accordance with one embodiment of the present disclosure. A server computer device 402 may include, but is not limited to, RC computing device 102 (shown in FIG. 1). Server computing device 402 may also include a processor 404 for executing instructions. Instructions may be stored in a memory area 406. Processor 404 may include one or more processing units (e.g., in a multi-core configuration).

Processor 404 may be operatively coupled to a communication interface 408 such that server computer device 402 is capable of communicating with a remote device such as another server computer device 402, RC computing device 102, user device 112, and insurance provider device 114 (shown in FIG. 1). For example, communication interface 408 may receive inputs, such as predesignated policy selections and/or submitted claims from user device 112 (shown in FIG. 1).

Processor 404 may also be operatively coupled to a storage device 420. Storage device 420 may be any computer-operated hardware suitable for storing and/or retrieving data. In some embodiments, storage device 420 may be integrated in server computer device 402. For example, server computer device 402 may include one or more hard disk drives as storage device 420.

In other embodiments, storage device 420 may be external to server computer device 402 and may be accessed by a plurality of server computer devices 402. For example, storage device 420 may include a storage area network (SAN), a network attached storage (NAS) system, and/or multiple storage units such as hard disks and/or solid state disks in a redundant array of inexpensive disks (RAID) configuration.

In some embodiments, processor 404 may be operatively coupled to storage device 420 via a storage interface 410. Storage interface 410 may be any component capable of providing processor 404 with access to storage device 420. Storage interface 410 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 420.

Processor 404 may execute computer-executable instructions for implementing aspects of the disclosure. In some embodiments, the processor 404 may be transformed into a special purpose microprocessor by executing computer-executable instructions or by otherwise being programmed, as described below in more detail with regard to FIG. 6.

Exemplary Computer Devices

Figure 5:
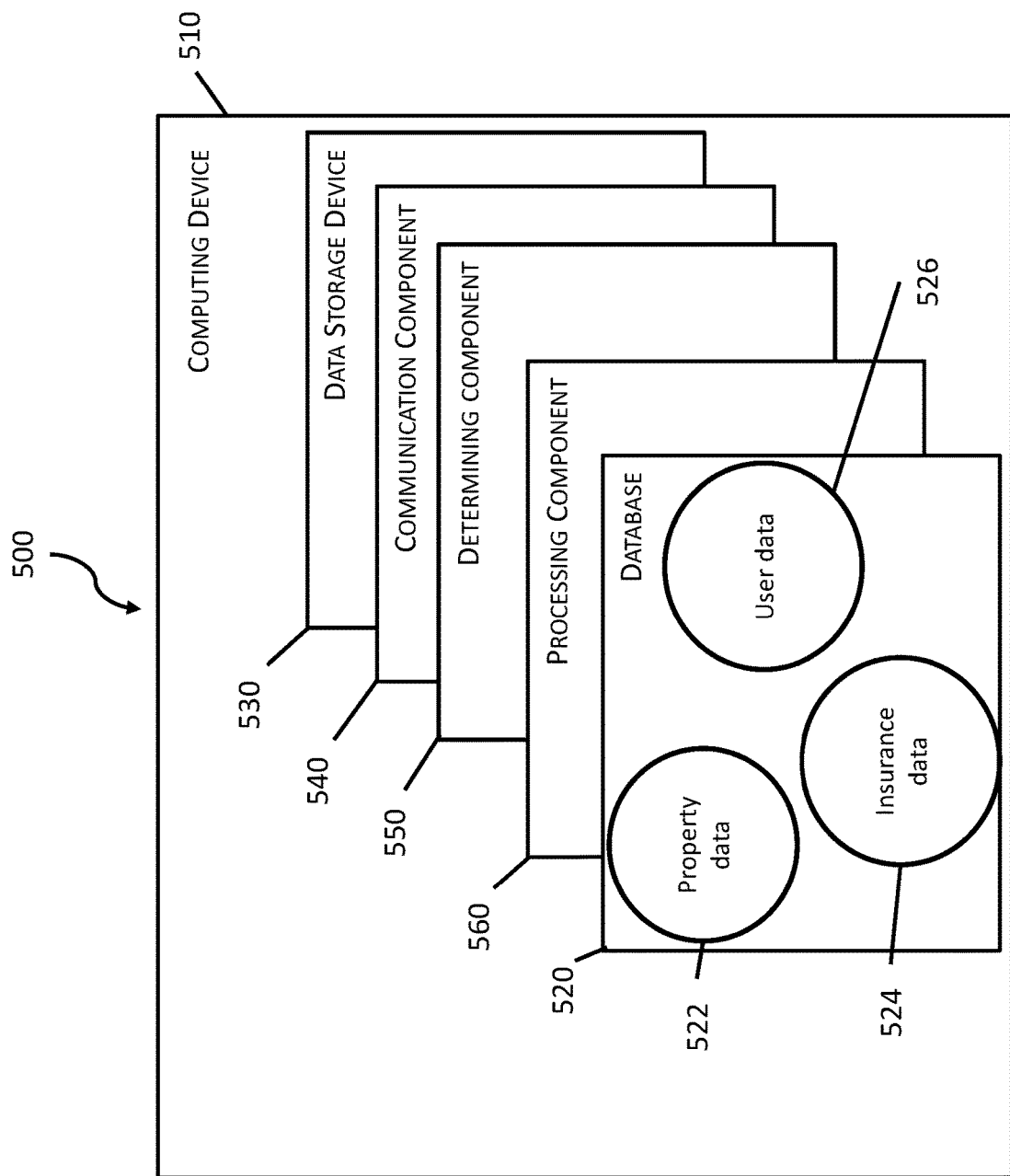
FIG. 5 illustrates a diagram of components of one or more exemplary computing devices that may be used in the exemplary computer system shown in FIG. 1.

FIG. 5 depicts a diagram 500 of components of one or more exemplary computing devices that may be used in system 100 (shown in FIG. 1) and/or to carry out process 200 (shown in FIG. 2).

In some embodiments, computing device 510 may be similar to RC computing device 102 (shown in FIG. 1). Database 520 may be coupled with several separate components within computing device 510, which perform specific tasks. In this embodiment, database 520 may include property data 522 (which may be associated with the items associated with the user and/or historical property data of policyholders), insurance data 524 (which may be associated with generated predesignated policy levels and/or selected policy levels of users), and user data 526 (which may be demographic and/or location data associated with the users). In some embodiments, database 520 is similar to database 106 (shown in FIG. 1).

Computing device 510 may include database 520, as well as a data storage device 530. Computing device 510 may also include a communication component 540 for transmitting and receiving data between user device 112 and insurance provider device 114 (shown in FIG. 1). Computing device 510 may further include a determining component 550 that may, for example, generate and/or determine predesignated policy levels and/or determine reimbursements (e.g., reimbursement 228 shown in FIG. 2) for user in response to a claim event. A processing component 560 may assist with execution of computer-executable instructions associated with the system.

Exemplary Computer-Implemented Methods

Figure 6:
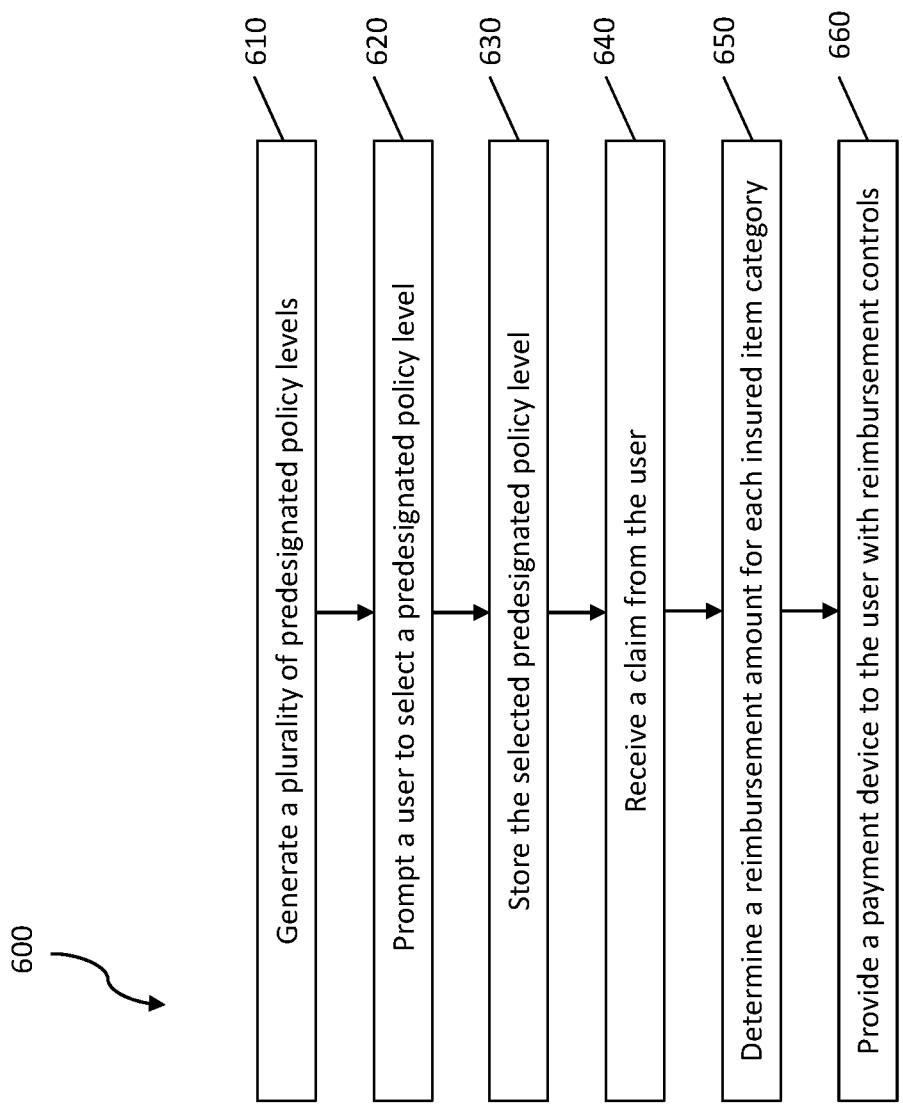
FIG. 6 illustrates a flow chart of an exemplary computer-implemented process that may be carried out by the exemplary computer system shown in FIG. 1.

FIG. 6 illustrates a flow chart of an exemplary computer implemented process 600 for generating predesignated policy levels and associated reimbursement controls for users. Process 600 may be implemented, at least in part, by a computing device, for example, RC computing device 102 (shown in FIG. 1).

Process 600 may include generating 610 a plurality of predesignated policy levels for a user based at least in part upon user data (e.g., input by the user into RC computing device 102). Each predesignated policy level of the plurality of predesignated policy levels may have a reimbursement maximum amount associated with the predesignated policy level. Process 600 may include prompting 620 the user to select a predesignated policy level of the plurality of predesignated policy levels, and the predesignated policy level may include an insurance policy covering one or more item categories by the user up to the reimbursement maximum. Process 600 may further include storing 630 the selected predesignated policy level of the user.

After a claim event, process 600 may include receiving 640 a claim from the user. Process may include determining 650, in response to the claim and based at least in part upon the selected predesignated policy level and the associated maximum reimbursement amount, an actual reimbursement amount for each insured item category of the one or more item categories. Further, process 600 may include providing 660 a payment device to the user having reimbursement controls, and the reimbursement control may provide the actual reimbursement amount to the user by insured item category. Process 600 may include additional steps and/or functionality, including that described herein.

Exemplary Embodiments & Functionalities

In an exemplary embodiment, at least one processor of a computer system (e.g., system 100) for providing reimbursement controls to insurance policies in communication with at least one memory device may be configured to: (i) generate a plurality of predesignated policy levels for a user based at least in part upon user data, wherein each predesignated policy level of the plurality of predesignated policy levels is associated with a maximum reimbursement amount, (ii) prompt the user to select a predesignated policy level of the plurality of predesignated policy levels, the predesignated policy level including an insurance policy covering one or more item categories up to the associated maximum reimbursement amount, (iii) store, in the at least one memory device, the selected predesignated policy level selected by the user, (iv) receive a claim from the user, (v) determine, in response to the claim and based at least in part upon the selected predesignated policy level and the associated maximum reimbursement amount, an actual reimbursement amount for each insured item category of the one or more item categories, and/or (vi) provide a payment device to the user, the payment device having one or more reimbursement controls for providing the actual reimbursement amount. The computer system may include additional, less, or alternate functionality, including that discussed elsewhere herein.

For example, one enhancement may be that the processor is further configured to: (i) receive user data associated with the user, wherein the user data includes demographic data and location data, (ii) predict a value of the items owned by the user in each insured item category based at least in part upon the received user data, and/or (iii) generate the plurality of predesignated policy levels based at least in part upon the received user data and the predicted values of the items owned by the user in each insured item category, wherein the plurality of predesignated policy levels includes different coverage amount for each insured item category, and wherein the plurality of predesignated policy levels includes a basic coverage amount, an intermediate coverage amount, and a premium coverage amount. Further, the payment device may be a prepaid card, and the prepaid card may include rules that restricts the user to purchase one or more replacement items associated with the insured item category and the actual reimbursement amount. The payment device may determine which insured item category the one or more replacement items are associated with based at least in part upon at least one of a merchant category and a stock keeping unit (SKU) of the one or more replacement items.

The processor may further be configured to: (i) receive a claim event associated with the claim, wherein the claim event includes a fire, a natural disaster, flooding, burglary, and theft, (ii) determine a percentage of damage associated with the items included in each of the insured item categories, (iii) adjust the actual reimbursement amount for each insured item category based at least in part upon the determined percentage of damage, and/or (iv) retrieve, from the at least one memory device, in response to receiving the claim, the predesignated policy level of the user. The insured item categories may include one of electronics, clothing, personal items, furniture, housewares, and specialty items.

In another exemplary embodiment, a computer-implemented method for providing reimbursement controls to insurance policies, the method implemented using a computer system including at least one processor in communication with at least one memory device may include: (i) generating a plurality of predesignated policy levels for a user based at least in part upon user data, wherein each predesignated policy level of the plurality of predesignated policy levels is associated with a maximum reimbursement amount, (ii) prompting the user to select a predesignated policy level of the plurality of predesignated policy levels, the predesignated policy level including an insurance policy covering one or more item categories up to the associated maximum reimbursement amount, (iii) storing, in the at least one memory device, the selected predesignated policy level selected by the user, (iv) receiving a claim from the user, (v) determining, in response to the claim and based at least in part upon the selected predesignated policy level and the associated maximum reimbursement amount, an actual reimbursement amount for each insured item category of the one or more item categories, and/or (vi) providing a payment device to the user having reimbursement controls, wherein the reimbursement controls provide the actual reimbursement amount to the user by insured item category. The method may include additional, less, or alternate actions, including those discussed elsewhere herein.

In a further exemplary embodiment, computer-executable instructions embodied on at least one transitory computer-readable storage media, when executed by at least one processor in communication with at least one memory device, may cause the at least one process to: (i) generate a plurality of predesignated policy levels for a user based at least in part upon user data, wherein each predesignated policy level of the plurality of predesignated policy levels is associated with a maximum reimbursement amount, (ii) prompt the user to select a predesignated policy level of the plurality of predesignated policy levels, the predesignated policy level including an insurance policy covering one or more item categories up to the associated maximum reimbursement amount, (iii) store, in the at least one memory device, the selected predesignated policy level selected by the user, (iv) receive a claim from the user, (v) determine, in response to the claim and based at least in part upon the selected predesignated policy level and the associated maximum reimbursement amount, an actual reimbursement amount for each insured item category of the one or more item categories, and/or (vi) provide a payment device to the user, the payment device having one or more reimbursement controls for providing the actual reimbursement amount. The instructions may direct additional, less, or alternate functionality, including that discussed elsewhere herein.

Examples of Machine Learning and Other Matters

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs.

Additionally or alternatively, the machine learning programs may be trained by inputting sample data sets or certain data into the programs, such as image, personal possession, claim, policy, and/or reimbursement data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs. In one embodiment, machine learning techniques may be used to extract data about the computer device, the user of the computer device, home owner and/or home, renter, geolocation information, image data, and/or other data.

Based at least in part upon these analyses, the processing element may learn how to identify characteristics and patterns that may then be applied to analyzing user data, policy data, item data, and/or other data. For example, the processing element may learn, with the user's permission or affirmative consent, to predict items, categories of items, and values associated with the categories of items associated with the user.

Examples of Additional Considerations

As will be appreciated based at least in part upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an exemplary embodiment, the system is executed on a single computer system, without needing a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed:

1. A computer device for providing reimbursement controls, the computer device including at least one processor in communication with at least one memory device, the computer device configured to:
   predict one or more item categories and associated values by applying a trained computing model to user data, the trained computing model being trained by at least one data selected from a group consisting of image data, personal possession data, claim data, and reimbursement data;
   generate a plurality of predesignated policy levels for a user based at least in part upon the user data and the one or more predicted item categories and associated values, wherein the plurality of predesignated policy levels cover one or more insured item categories;
   determine an actual reimbursement amount for each insured item category of the one or more item insured categories;
   generate one or more reimbursement controls based on the actual reimbursement amount and the one or more insured item categories; and
   program a payment device to include the one or more reimbursement controls for providing the actual reimbursement amount, wherein the one or more reimbursement controls include one or more rules that restrict the user to purchase one or more replacement items based upon the one or more insured item categories;
   wherein to generate the plurality of predesignated policy levels includes to:
     predict one or more values associated with one or more items owned by the user in each insured item category of the one or more item categories based at least in part upon the user data; and
     generate the plurality of predesignated policy levels based at least in part upon the user data and the predicted one or more values of the one or more items owned by the user in each insured item category of the one or more item categories.

2. The computer device of claim 1, wherein the computer device is further configured to receive an indication of a predesignated policy level selected from the plurality of predesignated policy levels.

3. The computer device of claim 1, wherein the payment device is configured to determine a purchase item category for one replacement item of the one or more replacement items; and
   wherein the payment device is further configured to decline the one replacement item if the purchase item category for the one replacement item does not match any insured item category of the one or more insured item categories.

4. The computer device of claim 1, wherein the payment device includes at least one selected from a group consisting of a prepaid card, a digital wallet, a charge card, and a gift card.

5. The computer device of claim 1, wherein the computer device is further configured to:
   receive a claim event associated with the claim, wherein the claim event includes at least one selected from a group consisting of a fire, a natural disaster, flooding, burglary, and theft; and
   determine a percentage of damage associated with the one or more items included in each insured item category of the one or more insured item categories.

6. The computer device of claim 5, wherein to determine the actual reimbursement amount for each insured item category includes to:
   adjust the actual reimbursement amount for each insured item category based at least in part upon the determined percentage of damage.

7. The computer device of claim 1, wherein the plurality of predesignated policy levels include a first predesignated policy level associated with a first maximum reimbursement amount for one of the one or more insured item categories and a second predesignated policy level associated with a second maximum reimbursement amount for the one of the one or more insured item categories, wherein the first maximum reimbursement amount is different from the second maximum reimbursement amount.

8. The computer device of claim 1, wherein the one or more insured item categories includes one of electronics, clothing, personal items, furniture, housewares, and specialty items.

9. A computer-implemented method for providing reimbursement controls, said method implemented using a computer system including at least one processor in communication with at least one memory device, the computer-implemented method comprising:
   predicting one or more item categories and associated values by applying a trained computing model to user data, the trained computing model being trained by at least one data selected from a group consisting of image data, personal possession data, claim data, and reimbursement data;
   generating a plurality of predesignated policy levels for a user based at least in part upon the user data and the one or more predicted item categories and associated values, wherein the plurality of predesignated policy levels cover one or more insured item categories;
   determining an actual reimbursement amount for each insured item category of the one or more insured item categories based on a claim received from the user and the plurality of predesignated policy levels;
   generating one or more reimbursement controls based on the actual reimbursement amount and the one or more insured item categories; and
   programming a payment device to include the one or more reimbursement controls for providing the actual reimbursement amount, wherein the one or more reimbursement controls include one or more rules that restrict the user to purchase one or more replacement items based upon the one or more insured item categories;

wherein the generating a plurality of predesignated policy levels includes:
  predicting one or more values associated with one or more items owned by the user in each insured item category of the one or more item categories based at least in part upon the user data; and
  generating the plurality of predesignated policy levels based at least in part upon the user data and the predicted one or more values of the one or more items owned by the user in each insured item category of the one or more item categories.

10. The computer-implemented method of claim 9, further comprising receiving an indication of a predesignated policy level selected from the plurality of predesignated policy levels.

11. The computer-implemented method of claim 9, wherein the payment device is configured to determine a purchase item category for one replacement item of the one or more replacement items based at least in part upon at least one selected from a group consisting of a merchant category and a stock keeping unit (SKU) of the one replacement item; and wherein the payment device is further configured to decline the one replacement item if the purchase item category for the one replacement item does not match each insured item category of the one or more item insured categories.

12. The computer-implemented method of claim 9, wherein the payment device includes at least one selected from a group consisting of a prepaid card, a digital wallet, a charge card, and a gift card.

13. The computer-implemented method of claim 9 further comprising:
  receiving a claim event associated with the claim, wherein the claim event includes a fire, a natural disaster, flooding, burglary, and theft; and
  determining a percentage of damage associated with the one or more items included in each insured item category of the insured one or more item categories.

14. The computer-implemented method of claim 13 further comprising:
  adjusting the actual reimbursement amount for each insured item category based at least in part upon the determined percentage of damage.

15. The computer-implemented method of claim 9 further comprising:
  retrieving, from the at least one memory device, in response to receiving the claim, a predesignated policy level selected by the user from the plurality of predesignated policy levels.

16. One or more non-transitory computer-readable storage media having computer-executable instructions thereon, wherein when executed by at least one processor, the computer-executable instructions cause the at least one processor to:
  predict one or more item categories and associated values by applying a trained computing model to user data, the trained computing model being trained by at least one data selected from a group consisting of image data, personal possession data, claim data, and reimbursement data;
  generate a plurality of predesignated policy levels for a user based at least in part upon the user data and the one or more predicted item categories and associated values, wherein the plurality of predesignated policy levels cover insured one or more item categories;
  determine an actual reimbursement amount for each insured item category of the one or more item categories based on a claim received from the user and the plurality of predesignated policy levels;
  generate one or more reimbursement controls based on the actual reimbursement amount and the insured one or more item categories; and
  program a payment device to include the one or more reimbursement controls for providing the actual reimbursement amount, wherein the one or more reimbursement controls include one or more rules that restrict the user to purchase one or more replacement items based upon the one or more insured item categories;
  wherein to generate the plurality of predesignated policy levels includes to:
    predict one or more values associated with one or more items owned by the user in each insured item category of the one or more item categories based at least in part upon the user data; and
    generate the plurality of predesignated policy levels based at least in part upon the user data and the predicted one or more values of the one or more items owned by the user in each insured item category of the one or more item categories.

17. The storage media of claim 16, wherein the computer-executable instructions further cause the processor to receive an indication of a predesignated policy level selected from the plurality of predesignated policy levels.

18. The storage media of claim 16, wherein the payment device is configured to determine a purchase item category for one replacement item of the one or more replacement items based at least in part upon at least one selected from a group consisting of a merchant category and a stock keeping unit (SKU) of the one replacement item; and wherein the payment device is further configured to decline the one replacement item if the purchase item category for the one replacement item does not match each insured item category of the insured one or more item categories.

19. The storage media of claim 16, wherein the payment device includes at least one selected from a group consisting of a prepaid card, a digital wallet, a charge card, and a gift card.

20. The storage media of claim 16, wherein the computer-executable instructions further cause the at least one processor to:
  receive a claim event associated with the claim, wherein the claim event includes one of a fire, a natural disaster, flooding, burglary, and theft;
  determine a percentage of damage associated with the one or more items included in each insured item category of the insured one or more item categories; and
  adjust the actual reimbursement amount for each insured item category based at least in part upon the determined percentage of damage.

21. A system for modeling a vehicle in a virtual environment, comprising:
  a means for storing data thereon; and
  a means for performing operations comprising:
    predicting one or more item categories and associated values by applying a trained computing model to user data, the trained computing model being trained by at least one data selected from a group consisting of image data, personal possession data, claim data, and reimbursement data;

generating a plurality of predesignated policy levels for a user based at least in part upon the user data and the one or more predicted item categories and associated values, wherein the plurality of predesignated policy levels cover one or more insured item categories;

determining an actual reimbursement amount for each insured item category of the one or more insured item categories based on a claim received from the user and the plurality of predesignated policy levels;

generating one or more reimbursement controls based on the actual reimbursement amount and the one or more insured item categories; and programming a payment device to include the one or more reimbursement controls for providing the actual reimbursement amount, wherein the one or more reimbursement controls include one or more rules that restrict the user to purchase one or more replacement items based upon the one or more insured item categories;

wherein the generating a plurality of predesignated policy levels includes:
  predicting one or more values associated with one or more items owned by the user in each insured item category of the one or more item categories based at least in part upon the user data; and
generating the plurality of predesignated policy levels based at least in part upon the user data and the predicted one or more values of the one or more items owned by the user in each insured item category of the one or more item categories.

* * * * *